United States Patent
Kulovesi et al.

(10) Patent No.: US 11,798,280 B2
(45) Date of Patent: Oct. 24, 2023

(54) METHOD AND SYSTEM FOR AUGMENTING POINT OF INTEREST IN AUGMENTED-REALITY VIDEO

(71) Applicant: Revieve Oy, Helsinki (FI)

(72) Inventors: Jakke Kulovesi, Helsinki (FI); Joonas Hamunen, Helsinki (FI); Samuli Siivinen, Valencia (ES)

(73) Assignee: Revieve Oy, Helsinki (FI)

( * ) Notice: Subject to any disclaimer, the term of this patent is extended or adjusted under 35 U.S.C. 154(b) by 441 days.

(21) Appl. No.: 17/218,673

(22) Filed: Mar. 31, 2021

(65) Prior Publication Data

US 2022/0318554 A1    Oct. 6, 2022

(51) Int. Cl.
| | | |
|---|---|---|
| *G06K 9/00* | (2022.01) | |
| *G06T 15/00* | (2011.01) | |
| *G06T 7/20* | (2017.01) | |
| *G06T 19/00* | (2011.01) | |
| *G06V 20/40* | (2022.01) | |

(52) U.S. Cl.
CPC .............. *G06V 20/46* (2022.01); *G06T 7/20* (2013.01); *G06T 15/005* (2013.01); *G06T 19/006* (2013.01)

(58) Field of Classification Search
CPC ......... G06V 20/46; G06T 7/20; G06T 15/005; G06T 19/006
See application file for complete search history.

(56) References Cited

U.S. PATENT DOCUMENTS

2007/0071289 A1*  3/2007  Takeguchi ........... G06V 40/171
                                                    382/118
2016/0372156 A1* 12/2016  Pound .................. G11B 27/105

OTHER PUBLICATIONS

Li et al, "Eye/eyes tracking based on a unified deformable template and particle filtering," 2010, Pattern Recognition Letters 31, pp. 1377-1387 (Year: 2010).*
European Patent Office, Extended European Search Report, Application No. 22152646.0, dated Jul. 8, 2022, 9 pages.
Li et al., "Eye/eyes tracking based on a 1-13 unified deformable template and particle filtering", Pattern Recognition Letters, Elsevier Amsterdam, vol. 31, No. 11, pp. 1377-1387, XP027071935, ISSN:0167-8655, DOI:10.1016/J.PATREC.2010.02.013, Aug. 1, 2022, 11 pages.

(Continued)

*Primary Examiner* — David F Dunphy
(74) *Attorney, Agent, or Firm* — Ziegler IP Law Group (57) ABSTRACT

A method for augmenting point of interest in AR video. The method includes: extracting first frame of AR video depicting object being tracked including point of interest, by first pipeline; locating, in first frame set of feature points forming boundary of object; transferring frame with determined set of feature points to second pipeline; and by second pipeline determining coordinate system of set of feature points; calculating first location parameters of feature points; selecting first and second reference points from feature points, wherein first location parameters of point of interest are defined by first location parameters of first and second reference points; transmitting first location parameters of point of interest from second pipeline to first pipeline; and augmenting in first pipeline AR video with first location parameters of point of interest received from second pipeline.

15 Claims, 3 Drawing Sheets

(56) References Cited

OTHER PUBLICATIONS

Wang et al, "Eye blink detection based on eye contour extraction" Algorithms and Technologies for Multispectral, Hyperspectral, And Ultraspectral Imagery XIX—Proceedings of Spie, vol. 7245, XP0559. 3453, ISSN: 0277-786X, DOI: 10.1117/12.804916, ISB: 978-1-5106-4548-6, Feb. 5, 2009, 8 pages, Retrieved from the Internet.

\* cited by examiner

METHOD AND SYSTEM FOR AUGMENTING POINT OF INTEREST IN AUGMENTED-REALITY VIDEO

TECHNICAL FIELD

The present disclosure relates to methods for augmenting points of interest in augmented-reality videos. Moreover, the present disclosure relates to systems for augmenting points of interest in augmented-reality videos. Further, the present disclosure relates to computer program products for augmenting points of interest in augmented-reality videos.

BACKGROUND

Over the past decade, video object tracking has gained popularity due to continued technological advancements and developments in video processing techniques. The video object tracking has applications in numerous fields, for example, security, surveillance, extended-reality technology, medical imaging, digital health and beauty, and the like. Particularly, development of techniques for the video object tracking in the digital health and beauty field is driving brands, retailers, e-commerce, digital service providers, and the like. For example, such developments enable in providing better user experiences upon dealing with personalized digital engagements with products relating to beauty, health, and wellness.

However, existing techniques for the video object tracking are associated with several limitations. For example, the existing techniques employ a set of limited trackable points to track an object in a video, which minimizes accuracy and quality of tracking the object in the video. For instance, when tracking facial features (such as eyes, lips, eyebrows, and the like) in the video, conventionally, a set of 68 trackable points are used for tracking said facial features of a human face. Particularly, for tracking an eye, a limited number of trackable points, for example, a set of 6 trackable points is used. The use of limited number of the trackable points preclude in accurately tracking outlines or boundaries (or any points of interest defining such outlines or boundaries) of said facial features. This in turn does not provide a required user experience upon dealing with the personalized digital engagements. One way to achieve a better user experience is to increase a number of trackable points. However, merely increasing the number of trackable points would require considerable computational processing resources and time.

Therefore, in light of the foregoing discussion, there exists a need to overcome the aforementioned drawbacks associated with existing techniques for the video object tracking.

SUMMARY

The present disclosure seeks to provide a method for augmenting a point of interest in an augmented-reality video. The present disclosure also seeks to provide a system for augmenting a point of interest in an augmented-reality video. Moreover, the present disclosure also seeks to provide a computer program product for augmenting a point of interest in an augmented-reality video. An aim of the present disclosure is to provide a solution that overcomes at least partially the problems encountered in prior art.

In one aspect, an embodiment of the present disclosure provides a method for augmenting a point of interest in an augmented-reality (AR) video, the method comprises extracting a first frame of the AR video running in a first pipeline, wherein the AR video depicting an object being tracked comprising the point of interest, by the first pipeline; locating, by the first pipeline, in the extracted first frame a set of feature points forming a boundary of the object; transferring the extracted frame with the determined set of feature points to a second pipeline; and by the second pipeline determining a coordinate system of the set of feature points; calculating a first location parameters of the feature points based on the determined coordinate system; selecting a first reference point and a second reference point from the feature points, wherein the first location parameters of the point of interest are defined by the first location parameters of the first and the second reference point; transmitting the first location parameters of the point of interest from the second pipeline to the first pipeline; and augmenting in the first pipeline the AR video with the first location parameters of the located point of interest received from the second pipeline.

In another aspect, an embodiment of the present disclosure provides a system for augmenting a point of interest in an augmented-reality (AR) video, the system comprising at least one processor, wherein the at least one processor is configured to extract, by executing a first pipeline, a first frame of the AR video running in the first pipeline, wherein the AR video depicting an object being tracked comprising the point of interest; locate, by executing the first pipeline, in the extracted first frame a set of feature points forming a boundary of the object; transfer the extracted frame with the determined set of feature points to a second pipeline; and by executing the second pipeline determine a coordinate system of the set of feature points; calculate a first location parameters of the feature points based on the determined coordinate system; select a first reference point and a second reference point from the feature points, wherein the first location parameters of the point of interest are defined by the first location parameters of the first and the second reference point; transmit the first location parameters of the point of interest from the second pipeline to the first pipeline; and augment, in the first pipeline, the AR video with the first location parameters of the located point of interest received from the second pipeline.

In yet another aspect, an embodiment of the present disclosure provides a computer program product for augmenting a point of interest in an augmented-reality (AR) video comprising instructions which, when the computer program is executed by a system comprising a processor, cause the system to extract, by executing a first pipeline, a first frame of the AR video running in the first pipeline, wherein the AR video depicting an object being tracked comprising the point of interest; locate, by executing the first pipeline, in the extracted first frame a set of feature points forming a boundary of the object; transfer the extracted frame with the determined set of feature points to a second pipeline; and by executing the second pipeline determine a coordinate system of the set of feature points; calculate a first location parameters of the feature points based on the determined coordinate system; select a first reference point and a second reference point from the feature points, wherein the first location parameters of the point of interest are defined by the first location parameters of the first and the second reference point; transmit the first location parameters of the point of interest from the second pipeline to the first pipeline; and augment, in the first pipeline, the AR video with the first location parameters of the located point of interest received from the second pipeline.

Embodiments of the present disclosure substantially eliminate or at least partially address the aforementioned problems in the prior art, and enable in tracking or identifying points of interest (that accurately define outlines or boundaries of an object) using trackable points, with minimal computational resources and time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

Figure

Figures

Figure

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for augmenting a point of interest in an augmented-reality (AR) video, the method comprises extracting a first frame of the AR video running in a first pipeline, wherein the AR video depicting an object being tracked comprising the point of interest, by the first pipeline; locating, by the first pipeline, in the extracted first frame a set of feature points forming a boundary of the object; transferring the extracted frame with the determined set of feature points to a second pipeline; and by the second pipeline determining a coordinate system of the set of feature points; calculating a first location parameters of the feature points based on the determined coordinate system; selecting a first reference point and a second reference point from the feature points, wherein the first location parameters of the point of interest are defined by the first location parameters of the first and the second reference points; transmitting the first location parameters of the point of interest from the second pipeline to the first pipeline; and augmenting in the first pipeline the AR video with the first location parameters of the located point of interest received from the second pipeline.

In another aspect, an embodiment of the present disclosure provides a system for augmenting a point of interest in an augmented-reality (AR) video, the system comprising at least one processor, wherein the at least one processor is configured to extract, by executing a first pipeline, a first frame of the AR video running in the first pipeline, wherein the AR video depicting an object being tracked comprising the point of interest; locate, by executing the first pipeline, in the extracted first frame a set of feature points forming a boundary of the object; transfer the extracted frame with the determined set of feature points to a second pipeline; and by executing the second pipeline determine a coordinate system of the set of feature points; calculate a first location parameters of the feature points based on the determined coordinate system; select a first reference point and a second reference point from the feature points, wherein the first location parameters of the point of interest are defined by the first location parameters of the first and the second reference points; transmit the first location parameters of the point of interest from the second pipeline to the first pipeline; and augment, in the first pipeline, the AR video with the first location parameters of the located point of interest received from the second pipeline.

In yet another aspect, an embodiment of the present disclosure provides a computer program product for augmenting a point of interest in an augmented-reality (AR) video comprising instructions which, when the computer program is executed by a system comprising a processor, cause the system to extract, by executing a first pipeline, a first frame of the AR video running in the first pipeline, wherein the AR video depicting an object being tracked comprising the point of interest; locate, by executing the first pipeline, in the extracted first frame a set of feature points forming a boundary of the object; transfer the extracted frame with the determined set of feature points to a second pipeline; and by executing the second pipeline determine a coordinate system of the set of feature points; calculate a first location parameters of the feature points based on the determined coordinate system; select a first reference point and a second reference point from the feature points, wherein the first location parameters of the point of interest are defined by the first location parameters of the first and the second reference points; transmit the first location parameters of the point of interest from the second pipeline to the first pipeline; and augment, in the first pipeline, the AR video with the first location parameters of the located point of interest received from the second pipeline.

The present disclosure provides the aforementioned method, the aforementioned system, and the aforementioned computer program product for augmenting a point of interest in an AR video. The embodiments of the present disclosure enable augmenting (namely, adding) the points of interest as trackable points in the AR video in addition to a set of limited feature points (namely, trackable points) to track an object in the AR video. Beneficially, this facilitates tracking the object in the AR video with considerable accuracy and improved quality when compared to utilizing the set of limited feature points alone for said tracking. Moreover, the embodiments of the present disclosure enable real-time augmentation of the points of interest in the AR video with minimal computational resources and thus are cost-efficient, reliable, and easy to use.

Optionally, the at least one processor is implemented as a single processor, wherein the single processor executes the first pipeline and the second pipeline. Alternatively, optionally, the at least one processor is implemented as at least one first processor and at least one second processor, wherein the at least one first processor executes the first pipeline and the at least one second processor executes the second pipeline. Optionally, the at least one first processor and the at least one second processor are located in the same device. Examples of the device may include, but are not limited to, a computer, a smartphone, a laptop, a tablet. As an example, the at least one first processor and the at least one second processor are located in the smartphone. Alternatively, optionally, the at least one first processor is located in a first device, and the at least one second processor is located in a second device. As an example, the at least one first processor is located in the smartphone, and the at least one second processor is located in the computer. Optionally, the at least one processor is implemented as at least one server. Optionally, in this regard, the at least one server is implemented as at least one first server and at least one second server, wherein the at least one first server executes the first pipeline and the at least one second server executes the second pipeline.

Optionally, the at least one processor is configured to receive the AR video from a video source. Optionally, the AR video comprises a plurality of frames (namely, image frames). The term "video source" refers to an equipment that is configured to provide the AR video to the at least one processor. Optionally, in this regard, the video source is communicably coupled to the at least one processor wirelessly and/or in a wired manner. In some implementations, the system further comprises the video source.

Throughout the present disclosure, the term "pipeline" refers to an image processing pipeline that is executed by the at least one processor in order to process the given frame. Optionally, a given pipeline employs at least one image processing algorithm for processing the given frame. Optionally, in this regard, the first pipeline employs a frame extraction algorithm to extract the given frame from amongst the plurality of frames of the AR video. It will be appreciated that the given frame could be extracted in an optimized manner from a sequence of the plurality of frames. In some implementations, at a given time instant, the given frame could be extracted in an arbitrary manner from the sequence of the plurality of frames. In other implementations, at the given time instant, the given frame could be extracted in a sequential manner from the sequence of the plurality of frames. In an example, if position of the object in the AR video changes rapidly, the given frame may be extracted on a per second basis.

Throughout the present disclosure, the term "object" refers to any feature depicted (namely, represented) in a given frame of the AR video. It will be appreciated that the object is associated with a boundary that is obtainable by joining a plurality of points lying on the periphery of the object. Examples of the object may include, but are not limited to, a facial feature (such as an eye, a nose, a lip, and the like), a body part (such as limbs, torso, and the like), a vehicle, a table, a toy, a door. Optionally, the given frame comprises an entirety or a part of the object. Notably, the object needs to be represented in at least two frames for tracking.

For example, in a frame of an AR video depicting an object being tracked may comprise a plurality of points of interest. The plurality of augmented points of interest, which define a corrected boundary of the object being tracked (e.g. an eye) are augmented corresponding to upper boundary (e.g. upper eyeliner) and lower boundary (e.g. lower eyeliner) locations of the object being tracked. The feature points utilized in augmenting the plurality of points of interest. Biases can be estimated as deviations from reference lines based on the feature points to the plurality of points of interest.

It will be appreciated that the point of interest may be understood to be a trackable point to be augmented in the AR video. In other words, the points of interest are desired points defining outlines or boundaries of the object. For example, the point of interest may be an actual corner of the eye, a corner of the lip, a corner of a door handle, and the like. Such augmentation provides addition of trackable points which are considerably precise and accurate to track the object depicted in the AR video thus, facilitates tracking of the object with improved accuracy as existing techniques allow tracking of the object using limited number of trackable points. For example, a typical set of 68 points in a human face is utilized when tracking a facial feature (such as, an eye, a lip, an eyebrow, and the like) in the AR video.

Throughout the present disclosure, the term "feature points" refers to fast-trackable points associated with the object. Optionally, the feature points are located on at least one of: edges, corners, blobs, ridges defining the outlines of the object in a given extracted frame. Optionally, the first pipeline employs the at least one image processing algorithm to detect the object in the given frame. Examples of such image processing algorithms include, but are not limited to, an object detection algorithm, an object recognition algorithm. Optionally, when the object is detected in the given frame, the first pipeline employs the at least one image processing algorithm to locate (namely, identify, determine or generate) the feature points forming the boundary of the object. Examples of such image processing algorithms include, but are not limited to, a corner detection algorithm, an edge detection algorithm, a feature point detection algorithm, a landmark detection algorithm. The image processing algorithms are well-known in the art. In a first example, there may be a set of 6 features points A1, A2, A3, A4, A5, and A6 forming a boundary of the eye, located in the extracted first frame. The set of features points A1, A2, A3, A4, A5, and A6 may be located by performing a six-point segmentation of the eye.

It will be appreciated that the at least one processor utilizes minimal computational resources in real time for executing the first pipeline to locate in the given extracted frame the set of feature points forming the boundary of the object. Further processing of the given extracted frame is performed by executing the second pipeline having required computational resources avoiding time latency. Optionally, the second pipeline implements a back-end static frame analysis for processing the given extracted frame. In a minimal implementation, only a single frame (such as the first frame) undergoes further processing using the second pipeline. It will be appreciated that, in order to determine locations of the feature points forming the boundary of the object, the at least one processor is configured to execute the second pipeline to determine the coordinate system.

Optionally, the step of determining the coordinate system is performed by determining a centre point of the boundary; based on the determined centre point of the boundary defining an X-axis direction; and determining scale parameters. Determining the coordinate system is performed by the at least one processor. To determine the coordinate system, the at least one processor is configured to determine a centre point of the boundary, based on the determined centre point of the boundary define an X-axis direction; and determine scale parameters.

The coordinate system is a two-dimensional coordinate system comprising an origin and two axes. Optionally, the centre point of the boundary corresponds to the origin of the coordinate system. Optionally, in this regard, the X-axis direction is defined based on the origin of the coordinate system. Moreover, optionally, the coordinate system comprises Y-axis. The Y-axis is orthogonal to (namely, 90 degrees to) the X-axis. In an example, the X-axis direction which is left to the centre point may correspond to a negative X-axis, while the X-axis direction which is right to the centre point may correspond to a positive X-axis. Additionally, the Y-axis direction which is above the centre point may correspond to a positive Y-axis, while the Y-axis direction which is below the centre point may correspond to a negative Y-axis. It will be appreciated that suitable scale parameters are employed in the coordinate system to facilitate ease in determining the locations of the feature points. Optionally, the scale parameters are determined based on at least one geometric parameter (such as length, breadth, height, and the like) associated with the object. The scale parameters are defined with certain units of measurements (such as centimetres, inches, and like). It will be appreciated that the coordinate system is fixed based on the determined set of feature points. Referring and continuing to the first example, the X and Y axes along with the scale parameters are determined based on a centre point of a boundary of the eye.

The coordinate system can be fixed based on some static properties between feature points. For example, feature points comprising point of interest of the object being tracked can be used for determining the x-axis direction and the scale parameters. The x-axis direction and scale parameters the measures that define the coordinate system. The x-axis direction can be for example parallel to the object being tracked.

In the embodiments the feature points of the object being tracked (e.g. an eye, a door or any other object having a boundary obtainable to from the feature points.) form a boundary of the object being tracked. In an example of an eye, a corner point of the eye can be a point of interest in the frame of the AR video. Between the point of interest of the eye and the augmented point of interest there a bias. The centre point of the boundary corresponds to the origin of the coordinate system, wherein the Y-axis being orthogonal to the X-axis. Location parameters (i.e. (x, y) coordinates) of the feature points are calculated based on the coordinate system. The location parameters of the augmented point of interest are calculated, by a second pipeline, as a function of locations of a first reference point RP1 and a second reference point RP2, a bias (i.e. a vector $\vec{d}$ corresponding to the bias, and a fraction of distance between the first reference point RP1 and the second reference point RP2 (i.e, an interpolation factor p/n).

In the embodiments, the coordinates of the augmented point of interest are calculated using a point having coordinates (x,y) lying on a line joining the first reference point RP1 and the second reference point RP2 using following equations:

$x = RP1x + ux*(p/n)$ $y = RP1y + uy*(p/n)$ wherein, RP1x and RP1y represent coordinates of the first reference point RP1; and $u_x$ and $u_y$ are differences of x and y coordinates of the first reference point RP1 and the second reference point RP2, respectively.

Optionally, the given location parameter of a given feature point is expressed as (x, y) position coordinates along the X and Y axes, respectively. Such position coordinates (namely, point data) indicate location of the given feature point (associated with the object) in the given frame (at a given time instant). Referring and continuing to the first example, the features points A1, A2, A3, A4, A5, and A6 may have the first location parameters (2, 1), (3, 1), (4, 0), (3, −1), (2, −1), and (1, 0), respectively forming a boundary of hexagonal shape.

Optionally, the first reference point and the second reference point are selected based on static properties (such as robustness) of the feature points. In other words, the first and the second reference points must be selected from amongst the feature points, to avoid or eliminate geometric anomalies such as translations, retroflexions, blurs, rotations, scaling, cropping, and the like. Beneficially, this enables considerable accuracy in defining the first location parameters of the point of interest in the given frame. Referring and continuing to the first example, selecting the feature points A3 and A6 as the first reference point and the second reference point, respectively may be robust. However, selecting the feature points A1 and A6 as the first reference point and the second reference point, respectively may not be robust as the feature points A1 and A6 follow opening of the eye and/or closure of the eye.

Optionally, for the given frame, the at least one processor is configured to execute the second pipeline to determine given location parameters for the point of interest. The given location parameters comprises values of a plurality of parameters, and wherein the plurality of parameters comprise: the given location parameters of the first and the second reference points, biases between the point of interest and a point lying a line joining the first and the second reference points, an interpolation factor. It will be appreciated that the given location parameters facilitates binding the point of interest (namely, an augmented point, an extra point or an additional point) with the first and the second reference points in such a way that the point of interest could be tracked in subsequent frame(s) of the AR video. Moreover, the given location parameters are scale invariant and rotation invariant. In other words, for the given frame, the location parameters of the point of interest would be the same irrespective of change in rotation and/or scale of the frame. It will be appreciated that, in such a case, the point of interest would be accurately located in different frames with the same location parameters irrespective of the change in rotation and/or scale of different frames. Optionally, the scale is measure in pixels. As an example, the given frame may be 10*100 pixels and may be at an angle of 0 degree with respect to a horizontal direction at one time instant. The given frame may be 26*26 pixels and may be at an angle of 10 degrees with respect to the horizontal direction at another time instant.

Optionally, the method further comprises extracting a second frame of the AR video in the first pipeline; determining, by the first pipeline, in the extracted second frame a set of second feature points forming a second boundary of the object; transferring the extracted second frame with the determined second set of feature points to the second pipeline; and by the second pipeline locating the point of interest in the second frame; recalculating second location parameters of the located point of interest in the second frame; transmitting the second location parameters of the point of interest from the second pipeline to the first pipeline; and augmenting in the first pipeline the AR video with the second location parameters of the located point of interest received from the second pipeline.

Optionally, the step of calculating the first and the second location parameters of the point of interest comprises determining a location of the first reference point and a location of the second reference point on the X-axis; calculating a bias between the point of interest and corresponding feature point; calculating a fraction of distance between the first reference point and the second reference point on the X-axis. In the embodiment, when calculating the first and the second location parameters of the point of interest, the at least one processor is configured to determine a location of the first reference point and a location of the second reference point on the X-axis; calculate a bias between the point of interest and corresponding feature point; and calculate a fraction of distance between the first reference point and the second reference point on the X-axis.

It will be appreciated that the location of the first reference point and the location of the second reference point are coordinates of the first reference point and the second reference point, as explained hereinabove. The term "bias" refers to a positional deviation between the point of interest and the corresponding feature point. The point of interest representing an actual point corresponding to the feature point (located by the first pipeline) is estimated by the second pipeline. The bias indicates a difference between the point of interest representing the actual point and the corresponding feature point that is located by the first pipeline. Optionally, the bias is calculated along the X-axis and/or the Y-axis. Optionally, the bias has a fixed value. Alternatively, optionally, the bias has a dynamic value. Optionally, the given location parameters of the point of interest are calculated, by the second pipeline, as a function of the locations of the first and the second reference points, the bias between the point of interest and the corresponding feature point, and the fraction of distance between the first and the second reference points. It will be appreciated that the fraction of distance between the first and the second reference points may be understood to be an interpolation factor. Optionally, the given location parameters of the point of interest are calculated by using at least one mathematical technique. Referring and continuing to the first example, locations of the first reference point A3 and the second reference point A6 may be determined on the X-axis and there may be a bias between the point of interest A representing a real corner of the eye and the corresponding feature point A6. Said bias may have a fixed value this is equal to ⅐ of width of the eye.

Notably, the given location parameters of the point of interest are transmitted from the second pipeline to the first pipeline in order to perform a reverse localization. The reverse localization is performed by the first pipeline to reconstruct a location of the point of interest in the subsequent frame(s) utilizing minimal computational resources. It will be appreciated that the location parameters of the point of interest (calculated using the locations of the first and the second reference points) are scale invariant and/or rotation invariant when transferred from the second pipeline to the first pipeline. The given location parameters of the located point of interest are added (namely, augmented) to the AR video in a manner that the point of interest would be trackable by the first pipeline. It will be appreciated that the point of interest would be tracked while updating the locations of the first reference point and the second reference point on the X-axis. During said updation, when the locations of the first reference point and the second reference point change (for example, in each frame(s)), the given location parameters of the point of interest are recalculated by the first pipeline.

At the step of calculating the second location parameters of the point of interest comprises determining a location of the first reference point and a location of the second reference point on the X-axis; calculating a bias between the point of interest and corresponding feature point; and calculating a fraction of distance between the first reference point and the second reference point on the X-axis.

Optionally, prior to recalculating the second location parameters of the located point of interest in the second frame, a second location parameters of the second feature points are calculated, based on the coordinate system and a first reference point and a second reference point are selected from the second feature points, wherein the second location parameters of the point of interest are defined by the first location parameters of the first and the second reference point. Notably, the set of second feature points in the second frame have different location parameters than the set of first feature points in the first frame. Optionally, in this regard, when selecting the first reference point and the second reference point (different from previously selected first reference point and previously selected second reference point) from the set of second feature points, the location parameters of the point of interest are recalculated by the second pipeline. In such a case, the first pipeline keeps utilizing the previously selected first reference point and the previously selected second reference point until locations of new first reference point and new second reference point are determined by the second pipeline at a point in time. Once the locations of the new first reference point and the new second reference point are determined, the second location parameters of the point of interest in the second frame, are calculated.

Optionally, the method further comprises recalculating the location parameters for each frame, for every determined frame, for every determined time interval, and/or for a changed position, location or angle of the object being tracked. The at least one processor is further configured to recalculate the location parameters for each frame, for every determined frame, for every determined time interval, and/or for a changed position, location or angle of the object being tracked. It will be appreciated that location parameters of the feature points may change when a position, a location or an angle of the object changes in the given frame. This can be attributed to the fact that the position coordinates may change in the given frame when the position, the location or the angle of the object changes. It will also be appreciated that the location parameters of the feature points may be understood to be indices of the feature points.

Optionally, the method further comprises detecting a return of the point of interest to a previously located condition; and re-using previously recalculated location parameters by transmitting the previously recalculated location parameters of the point of interest from the second pipeline to the first pipeline. The at least one processor is further configured to detect a return of the point of interest to a previously located condition; and re-use previously recalculated location parameters by transmitting the previously recalculated location parameters of the point of interest from the second pipeline to the first pipeline.

Optionally, the at least one processor is configured to detect the return of the point of interest to the previously located condition when the location parameters of the point of interest in at least two frames are the same. In an example, when the location parameters of the point of interest in the first frame and corresponding location parameters of the point of interest in the second are same, the points of interest are same or a return of the point of interest to the previously located condition is detected. It will be appreciated that re-using the previously recalculated location parameters requires minimal computational resources and/or computational time, and thus beneficial in reducing computational burden on the at least one processor.

Optionally, the method further comprises determining a shape of the object by employing the set of feature points and the point of interest, wherein the shape of the object is determined using an interpolation technique and/or an extrapolation technique. It will be appreciated that the shape of the object is determined based on a shape of trajectory of points obtained using the interpolation technique (such as, static interpolation, liner interpolation, circular interpolation, and the like) and/or the extrapolation technique. The interpolation techniques and the extrapolation techniques are well-known in the art.

Optionally, the method further comprises employing at least one point of interest when superimposing at least one virtual object in the plurality of frames of the AR video. Additionally, optionally, the method further comprises employing one or more of the feature points when superimposing the at least one virtual object in the plurality of frames of the AR video. It will be appreciated that superimposing the at least one virtual object in the plurality of frames of the video of the object (which is a real-world object) being tracked provides an AR application. Optionally, in this regard, the at least one processor is configured to digitally superimpose the at least one virtual object in the plurality of frames of the AR video to generate a plurality of AR frames. The term "virtual object" refers to a computer-generated object. Examples of the at least one virtual object include, but are not limited to, a virtual health and beauty tool (such as, a virtual eye shadow, a virtual eyeliner, a virtual lipstick, a virtual foundation, a virtual blush, etc.), a virtual navigation tool (such as a virtual map, a virtual direction signage, etc.), a virtual gadget (such as a virtual calculator, a virtual computer, etc.), a virtual message (such as a virtual instant message, a virtual chat conversation, a virtual to-do note, etc.), a virtual entity (such as a virtual person, a virtual animal, a virtual ghost, etc.), a virtual entertainment media (such as a virtual painting, a virtual video, a virtual interactive advertisement, etc.), and a virtual information (such as a virtual news description, a virtual announcement, virtual data, etc.).

Throughout the present disclosure, the term "computer program product" refers to a software product comprising program instructions that are recorded on the non-transitory machine-readable data storage medium, wherein the software product is executable upon a computing hardware for implementing the aforementioned steps of the method for augmenting the point of interest in the AR video. The non-transitory machine-readable data storage medium can direct a machine (such as computer, other programmable data processing apparatus, or other devices) to function in a particular manner, such that the program instructions stored in the non-transitory machine-readable data storage medium cause a series of steps for augmenting the point of interest in the AR video. Examples of the non-transitory machine-readable data storage medium includes, but is not limited to, an electronic storage device, a magnetic storage device, an optical storage device, an electromagnetic storage device, a semiconductor storage device, a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, or any suitable combination thereof. Throughout the present disclosure, the term "processor" refers to a hardware, software, firmware, or a combination of these, for processing the program instructions of the computer program product.

The present disclosure also relates to the system as described above. Various embodiments and variants disclosed above, with respect to the aforementioned first aspect, apply mutatis mutandis to the system.

Optionally, the at least one processor is further configured to extract a second frame of the AR video in the first pipeline; determine, by using the first pipeline, in the extracted second frame a set of second feature points forming a second boundary of the object; transfer the extracted second frame with the determined second set of feature points to the second pipeline; locate, the second pipeline, the point of interest in the second frame; recalculate, by using the second pipeline, second location parameters of the located point of interest in the second frame; transmit the second location parameters of the point of interest from the second pipeline to the first pipeline; and augment, in the first pipeline, the AR video with the second location parameters of the located point of interest received from the second pipeline.

DETAILED DESCRIPTION OF THE DRAWINGS

Figure 1:
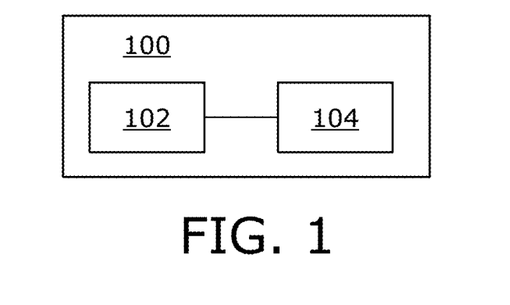
FIG. 1 illustrates a block diagram of architecture of a system for augmenting a point of interest in an augmented-reality (AR) video, in accordance with an embodiment of the present disclosure.

Referring to FIG. 1, illustrated is a block diagram of architecture of a system 100 for augmenting a point of interest in an augmented-reality (AR) video, in accordance with an embodiment of the present disclosure. The system 100 comprises a processor 102 and a video source 104. It will be appreciated that the processor 102 is configured to execute a first pipeline and a second pipeline for augmenting the point of interest in the AR video received from the video source 104.

Figure 2A:
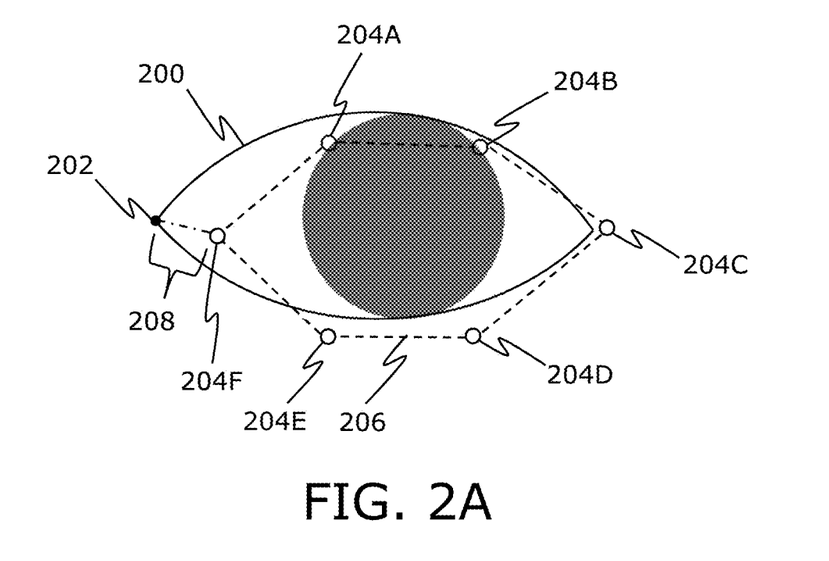
FIG. 2A, FIG. 2B, and FIG. 2C illustrate an exemplary object depicted in an AR video, an exemplary coordinate system, an exemplary calculation of location parameters of an augmented point of interest, respectively, in accordance with an embodiment of the present disclosure.
Figure 2B:
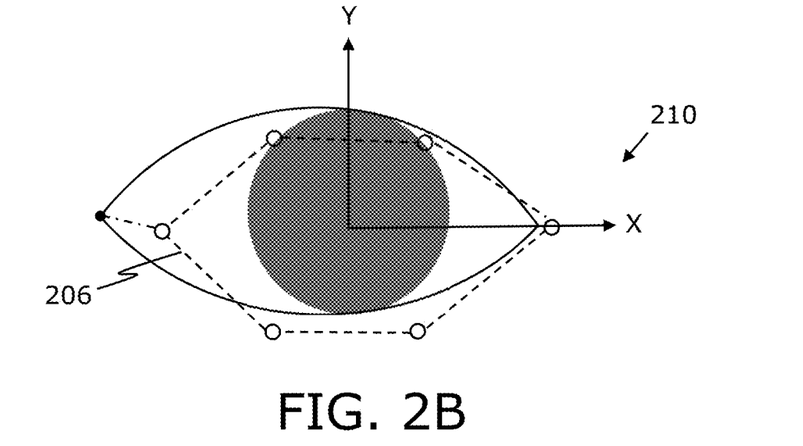
Figure 2C:
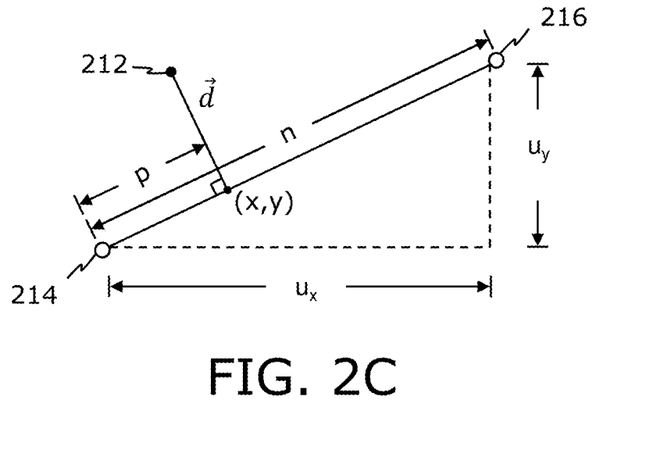

Referring to figures FIG. 2A, FIG. 2B, and FIG. 2C illustrated are an exemplary object being tracked 200 depicted in an AR video, an exemplary coordinate system 210, and an exemplary calculation of location parameters of an augmented point of interest, respectively, in accordance with an embodiment of the present disclosure.

In FIG. 2A, the object being tracked 200 is shown as an eye being tracked in a frame of the AR video comprising a corner point of the eye as a point of interest 202 in the frame and a set of six feature points 204A, 204B, 204C, 204D, 204E, 204F forming a boundary 206 (depicted as dashed line) of the object being tracked 200. There is also shown a bias 208 between the point of interest 202 of the eye and the feature point 204F.

In FIG. 2B, the coordinate system 210 comprises an origin, an X-axis and a Y-axis. Herein, a centre point of the boundary 206 corresponds to the origin. As shown, the Y-axis being orthogonal to the X-axis. Location parameters (i.e. (x, y) coordinates) of the feature points 204A, 204B, 204C, 204D, 204E, 204F (shown in FIG. 2A) are calculated based on the coordinate system 210.

In FIG. 2C, the location parameters of an augmented point of interest 212 are calculated, by a second pipeline, as a function of locations of a first reference point RP1 214 (corresponding to the feature point 204F of FIG. 2A) and a second reference point RP2 216 (corresponding to the feature point 204C of FIG. 2A), a bias (depicted as a vector $\vec{d}$ corresponding to the bias 208 of FIG. 2A), and a fraction of distance between the first reference point RP1 214 and the second reference point RP2 216 (i.e., an interpolation factor p/n). As shown, coordinates of the augmented point of interest 212 are calculated using a point having coordinates (x,y) lying on a line joining the first reference point RP1 214 and the second reference point RP2 216 using following equations:

$$x = RP1x + u_x*(p/n)$$

$$y = RP1y + u_y*(p/n)$$

wherein, $RP1x$ and $RP1y$ represent coordinates of the first reference point RP1 214; and $u_x$ and $u_y$ are differences of x and y coordinates of the first reference point RP1 214 and the second reference point RP2 216, respectively.

Figure 3:
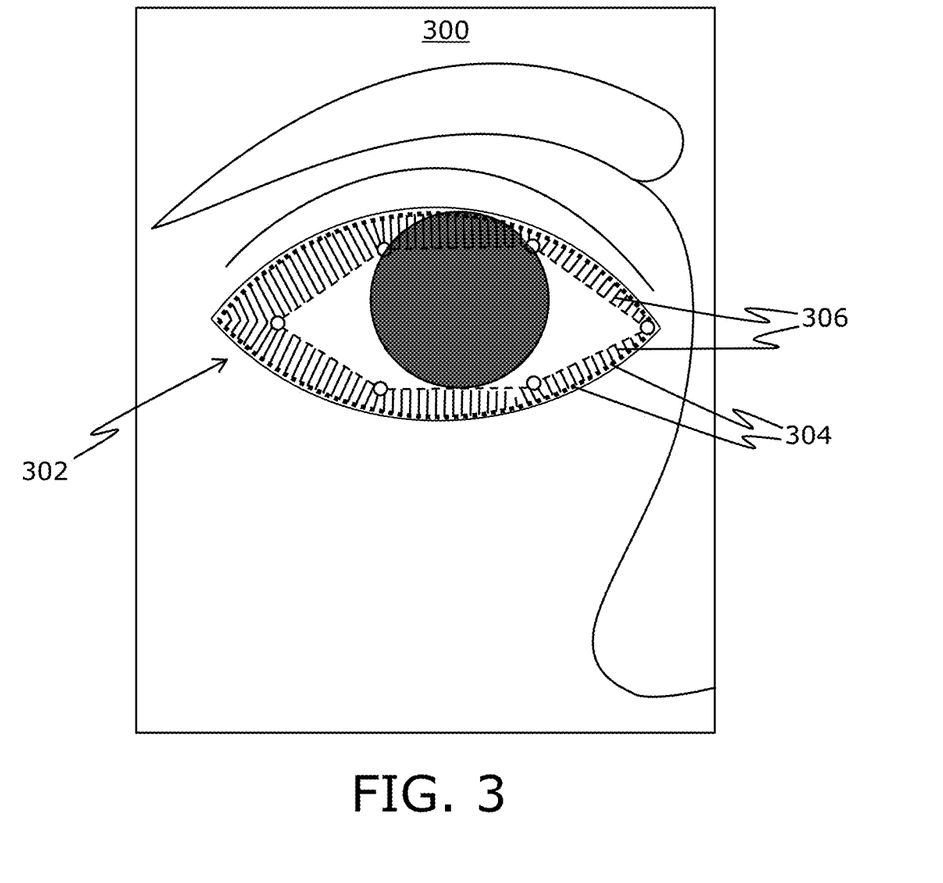
FIG. 3 illustrates an exemplary frame of an AR video depicting augmented point of interest, in accordance with an embodiment of the present disclosure; and Figure

Referring to FIG. 3, illustrated is an exemplary frame 300 of an AR video depicting augmented point of interest, in accordance with an embodiment of the present disclosure. As shown, the frame 300 depicts an object being tracked comprising an eye 302 with a plurality of points of interest 304. The plurality of points of interest 304 (defining a corrected boundary of the eye 302) are augmented corresponding to upper eyeliner and lower eyeliner locations of the eye 302. Also shown are six feature points (depicted as six circular dots arranged in a hexagonal manner) utilized in augmenting the plurality of points of interest 304. Biases 306 (depicted as solid lines) are shown to be estimated as deviations from reference lines (depicted as dashed lines) based on the six feature points to the plurality of points of interest.

Figure 4:
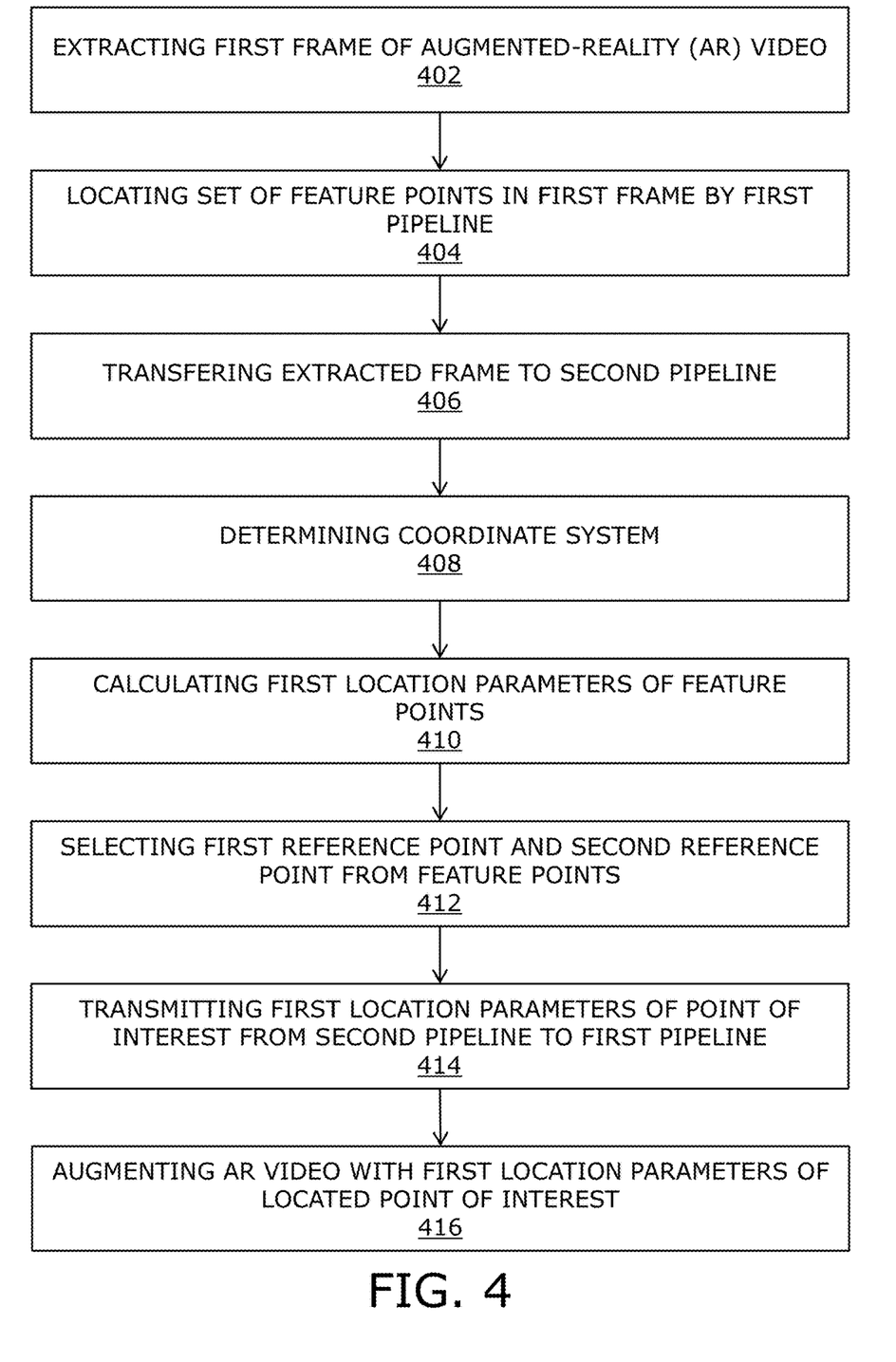
FIG. 4 illustrates steps of a method for augmenting a point of interest in an AR video, in accordance with an embodiment of the present disclosure.

Referring to FIG. 4, illustrated are steps of a method for augmenting a point of interest in an AR video, in accordance with an embodiment of the present disclosure. At step 402, a first frame of the AR video running in a first pipeline is extracted by the first pipeline, wherein the AR video depicting an object being tracked comprising the point of interest. At step 404, a set of feature points forming a boundary of the object in the extracted first frame is located by the first pipeline. At step 406, the extracted frame with the determined set of feature points is transferred to a second pipeline. At step 408, a coordinate system of the set of feature points is determined by the second pipeline. At step 410, a first location parameters of the feature points are calculated, by the second pipeline, based on the determined coordinate system. At step 412, a first reference point and a second reference point are selected from the feature points, by the second pipeline, wherein the first location parameters of the point of interest are defined by the first location parameters of the first and the second reference points. At step 414, the first location parameters of the point of interest are transmitted from the second pipeline to the first pipeline. At step 416, the AR video is augmented, in the first pipeline, with the first location parameters of the located point of interest received from the second pipeline.

The steps 402, 404, 406, 408, 410, 412, 414, and 416 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A method for augmenting a point of interest in an augmented-reality video, the method comprising:
    extracting a first frame of the AR video running in a first pipeline, wherein the AR video depicting an object being tracked comprises the point of interest, by the first pipeline;
    locating, by the first pipeline, in the extracted first frame a set of feature points forming a boundary of the object;
    transferring the extracted frame with the determined set of feature points to a second pipeline; and by the second pipeline
    determining a coordinate system of the set of feature points;
    calculating a first location parameters of the feature points based on the determined coordinate system;
    selecting a first reference point and a second reference point from the feature points, wherein the first location parameters of the point of interest are defined by the first location parameters of the first and the second reference points;
    transmitting the first location parameters of the point of interest from the second pipeline to the first pipeline; and
    augmenting in the first pipeline the AR video with the first location parameters of the located point of interest received from the second pipeline.

2. The method according to claim 1, wherein the method further comprises:
    extracting a second frame of the AR video in the first pipeline;
    determining, by the first pipeline, in the extracted second frame a set of second feature points forming a second boundary of the object;
    transferring the extracted second frame with the determined second set of feature points to the second pipeline; and by the second pipeline
    locating the point of interest in the second frame;
    recalculating second location parameters of the located point of interest in the second frame;
    transmitting the second location parameters of the point of interest from the second pipeline to the first pipeline;
    augmenting in the first pipeline the AR video with the second location parameters of the located point of interest received from the second pipeline.

3. The method according to claim 2, wherein determining the coordinate system is performed by:
    determining a centre point of the boundary;
    based on the determined centre point of the boundary defining an X-axis direction; and
    determining scale parameters.

4. The method according to claim 1, wherein determining the coordinate system is performed by:
    determining a centre point of the boundary;
    based on the determined centre point of the boundary defining an X-axis direction; and
    determining scale parameters.

5. The method according to claim 1, wherein calculating the first and the second location parameters of the point of interest comprises:

determining a location of the first reference point and a location of the second reference point on the X-axis;
calculating a bias between the point of interest and corresponding feature point;
calculating a fraction of distance between the first reference point and the second reference point on the X-axis.

6. The method according to claim 1, wherein the method further comprises recalculating the location parameters for each frame, for every determined frame, for every determined time interval, and/or for a changed position, location or angle of the object being tracked.

7. The method according to claim 6, wherein the method further comprises:
detecting a return of the point of interest to a previously located condition;
re-using previously recalculated location parameters by transmitting the previously recalculated location parameters of the point of interest from the second pipeline to the first pipeline.

8. A system for augmenting a point of interest in an augmented-reality video, the system comprising at least one processor, wherein the at least one processor is configured to:
extract, by executing a first pipeline, a first frame of the AR video running in the first pipeline, wherein the AR video depicting an object being tracked comprising the point of interest;
locate, by executing the first pipeline, in the extracted first frame a set of feature points forming a boundary of the object;
transfer the extracted frame with the determined set of feature points to a second pipeline; and by executing the second pipeline
determine a coordinate system of the set of feature points;
calculate a first location parameters of the feature points based on the determined coordinate system;
select a first reference point and a second reference point from the feature points, wherein the first location parameters of the point of interest are defined by the first location parameters of the first and the second reference points;
transmit the first location parameters of the point of interest from the second pipeline to the first pipeline; and
augment, in the first pipeline, the AR video with the first location parameters of the located point of interest received from the second pipeline.

9. The system according to claim 8, wherein the at least one processor is further configured to:
extract a second frame of the AR video in the first pipeline;
determine, by using the first pipeline, in the extracted second frame a set of second feature points forming a second boundary of the object;
transfer the extracted second frame with the determined second set of feature points to the second pipeline;
locate, the second pipeline, the point of interest in the second frame;
recalculate, by using the second pipeline, second location parameters of the located point of interest in the second frame;
transmit the second location parameters of the point of interest from the second pipeline to the first pipeline; and
augment, in the first pipeline, the AR video with the second location parameters of the located point of interest received from the second pipeline.

10. The system according to claim 9, wherein to determine the coordinate system, the at least one processor is configured to:
determine a centre point of the boundary;
based on the determined centre point of the boundary define an X-axis direction; and
determine scale parameters.

11. The system according to claim 9, wherein to calculate the first and the second location parameters of the point of the interest, the at least one processor is configured to:
determine a location of the first reference point and a location of the second reference point on the X-axis;
calculate a bias between the point of interest and corresponding feature point; and
calculate a fraction of distance between the first reference point and the second reference point on the X-axis.

12. The system according to claim 11, wherein the at least one processor is further configured to:
detect a return of the point of interest to a previously located condition; and
re-use previously recalculated location parameters by transmitting the previously recalculated location parameters of the point of interest from the second pipeline to the first pipeline.

13. The system according to claim 8, wherein to determine the coordinate system, the at least one processor is configured to:
determine a centre point of the boundary;
based on the determined centre point of the boundary define an X-axis direction; and
determine scale parameters.

14. The system according to claim 8, wherein the at least one processor is further configured to recalculate the location parameters for each frame, for every determined frame, for every determined time interval, and/or for a changed position, location or angle of the object being tracked.

15. A computer program product for augmenting a point of interest in an augmented-reality video comprising instructions which, when the computer program is executed by a system comprising a processor, cause the system to:
extract, by executing a first pipeline, a first frame of the AR video running in the first pipeline, wherein the AR video depicting an object being tracked comprising the point of interest;
locate, by executing the first pipeline, in the extracted first frame a set of feature points forming a boundary of the object;
transfer the extracted frame with the determined set of feature points to a second pipeline; and by executing the second pipeline
determine a coordinate system of the set of feature points;
calculate a first location parameters of the feature points based on the determined coordinate system;
select a first reference point and a second reference point from the feature points, wherein the first location parameters of the point of interest are defined by the first location parameters of the first and the second reference point;
transmit the first location parameters of the point of interest from the second pipeline to the first pipeline; and augment, in the first pipeline, the AR video with the first location parameters of the located point of interest received from the second pipeline.

\* \* \* \* \*